March 20, 1951  E. RICHTER  2,545,494
HYDRAULIC LEVELING APPARATUS FOR MOTOR VEHICLES
Filed May 13, 1948  4 Sheets-Sheet 2
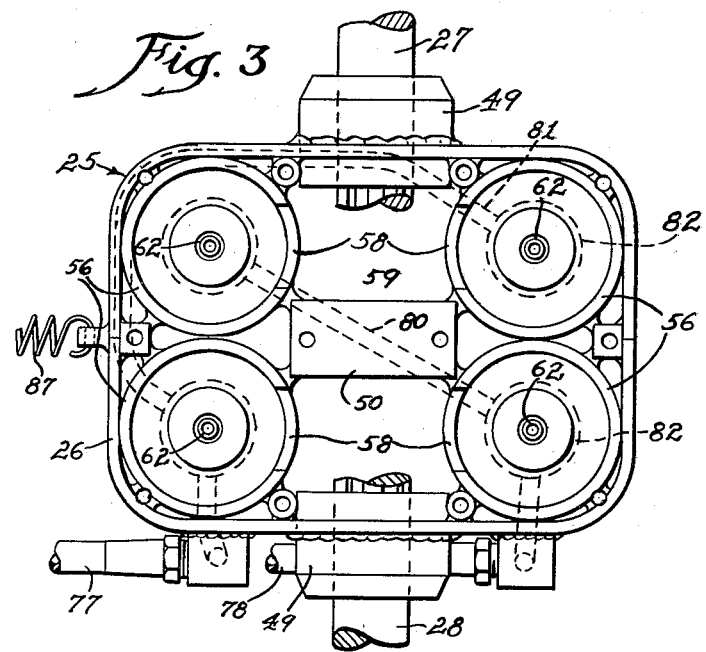
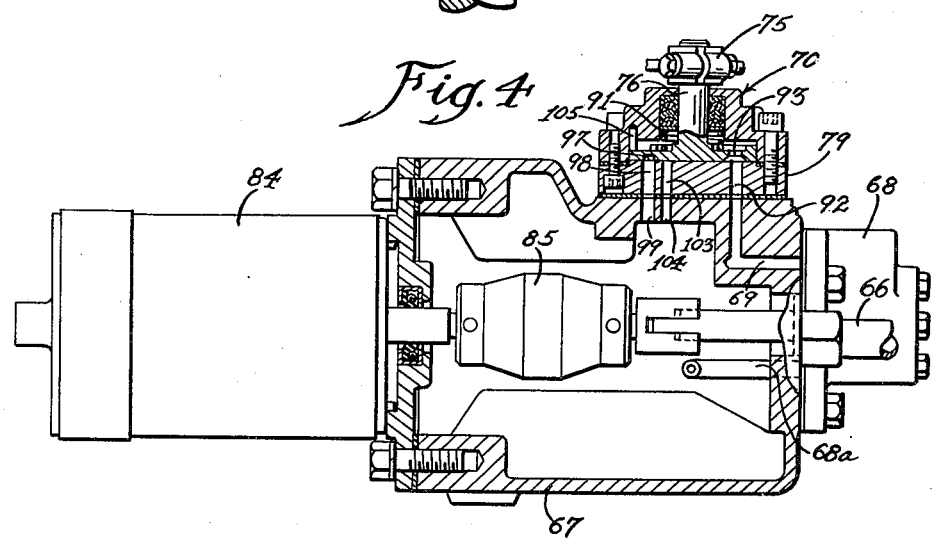
Inventor:
Edward Richter March 20, 1951 E. RICHTER 2,545,494
HYDRAULIC LEVELING APPARATUS FOR MOTOR VEHICLES
Filed May 13, 1948 4 Sheets-Sheet 3
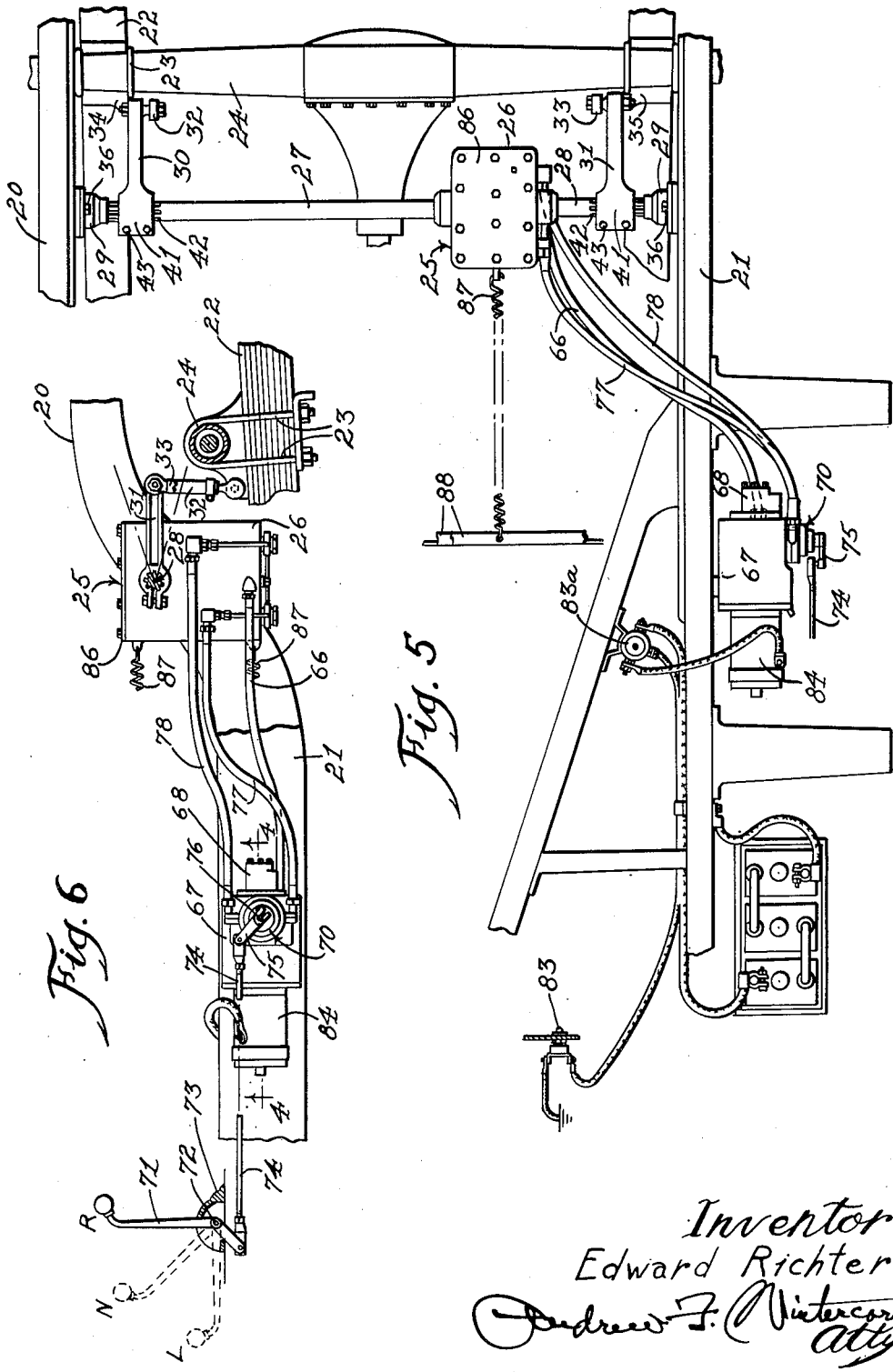
Inventor:
Edward Richter March 20, 1951            E. RICHTER            2,545,494
HYDRAULIC LEVELING APPARATUS FOR MOTOR VEHICLES
Filed May 13, 1948            4 Sheets-Sheet 4
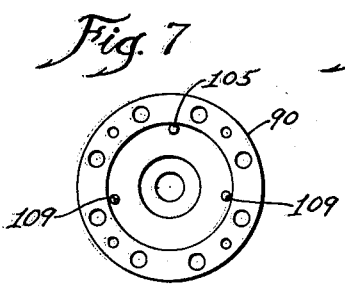
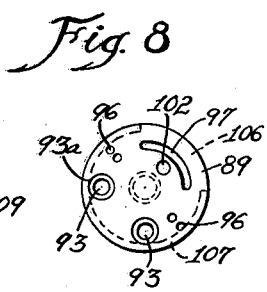
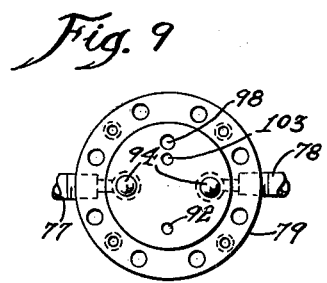
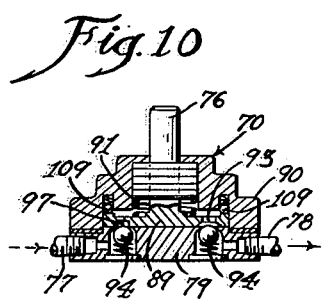
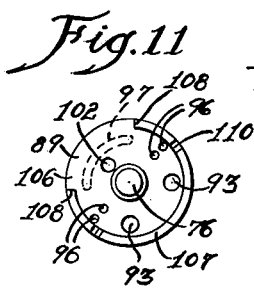
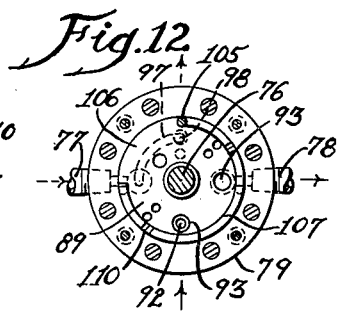
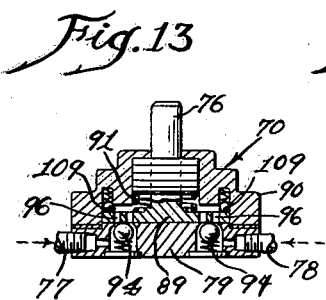
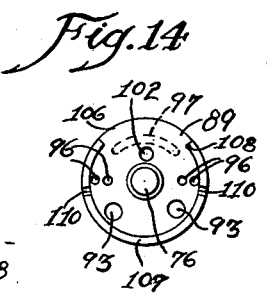
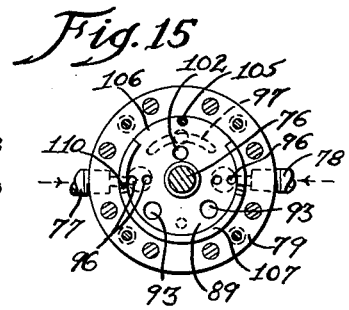
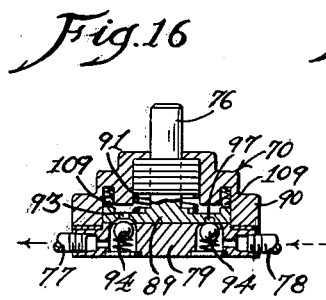
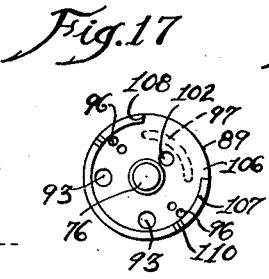
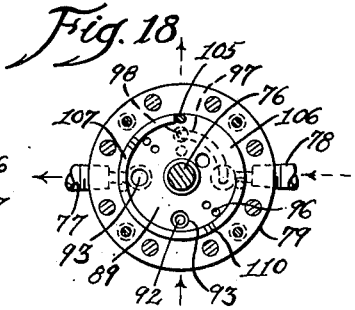
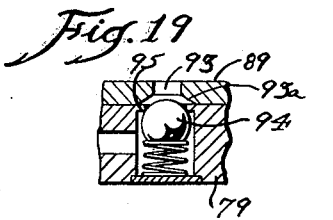
Inventor:
Edward Richter Patented Mar. 20, 1951

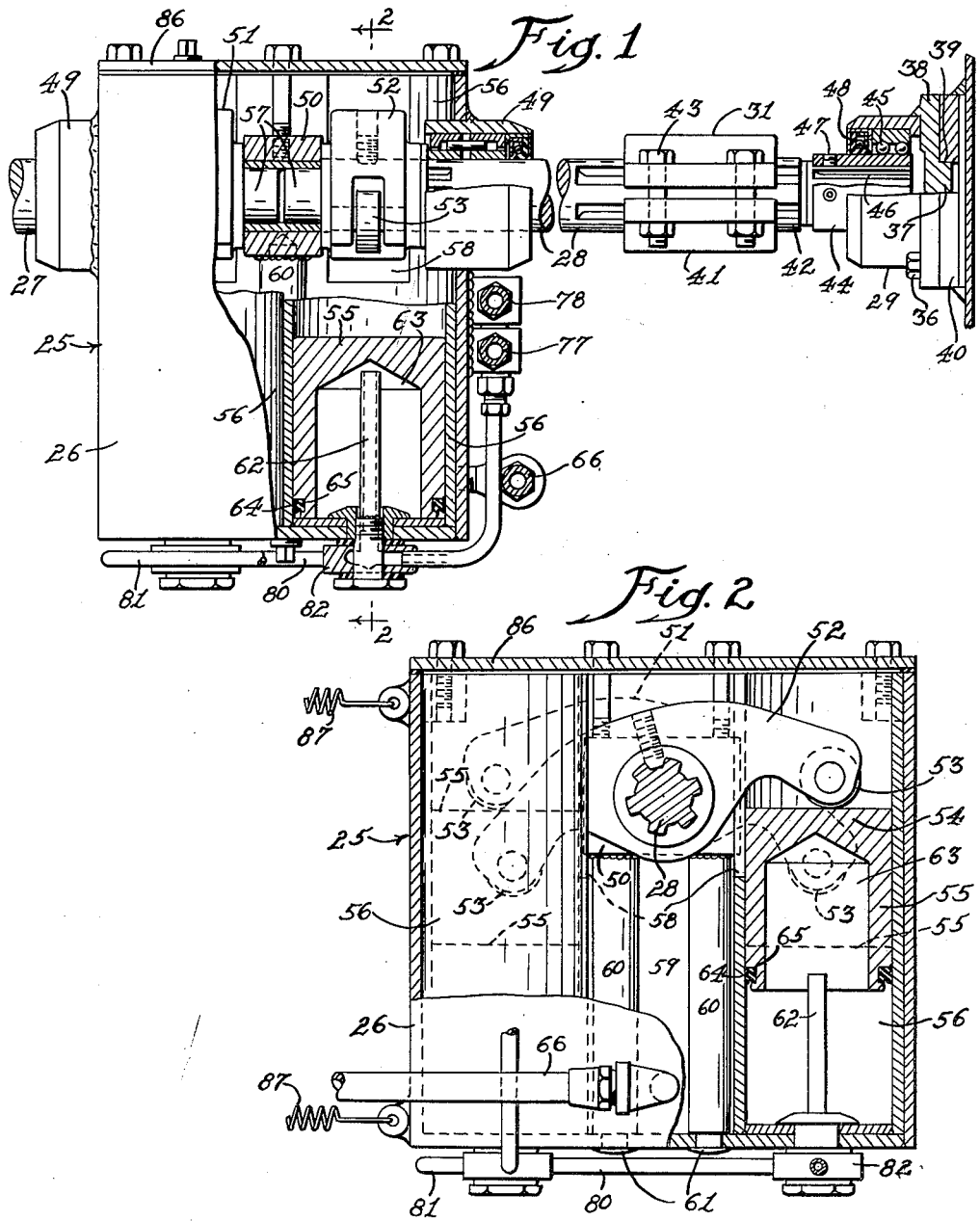

2,545,494

UNITED STATES PATENT OFFICE 2,545,494

HYDRAULIC LEVELING APPARATUS FOR MOTOR VEHICLES

Edward Richter, Freeport, Ill.

Application May 13, 1948, Serial No. 26,756

34 Claims. (Cl. 280—6)

1

The disclosure of the present application constitutes an improvement upon that disclosed in my copending application, Serial No. 651,363, filed March 1, 1946.

This invention relates to leveling apparatus for motor vehicles generally, although the present apparatus was designed with particular reference to side service hearses, the bodies of which require leveling to secure proper disposition of the casket table in a horizontal plane in loading and unloading the casket. The invention, as will soon appear, is applicable to taxicabs and any other motor vehicle, and, in fact, any vehicle having spring suspension.

In my earlier Patent 2,148,504, I disclosed what might be called a "built-in" leveling apparatus because of the fact that the working cylinders are assembled on the vehicle frame in rigid relation thereto. Such installations are necessarily expensive, and it is also a problem to apply such apparatuses to some cars, and, in a number of instances, it is not at all practical to do so. It is, therefore, the principal object of my invention to provide a simpler and more economical leveling apparatus and one that is far more compact in construction and is of unitary design and adapted for substantially universal application to cars of different makes.

A salient feature of the leveling apparatus of my invention consists in the arrangement of two shafts disposed in coaxial relation and extending from opposite sides of a leveler housing crosswise of the vehicle frame and substantially in parallel relation to the rear axle housing, these shafts being suitably supported at their outer ends in bearings provided therefor on the frame and being rotatable in opposite directions by hydraulic means in the leveler housing to positively lift one side and positively lower the other side of the vehicle frame relative to the rear axle housing, the two shafts being connected by levers and links to the spring shackles adjacent the rear axle housing to secure the leveling movement. With this novel unit, therefore, there is only the mounting of bearings on the opposite sides of the frame and the connection of the links to the spring shackles to complete any installation, these few simple operations taking only a small fraction of the time required to install a so-called "built-in" type of apparatus, besides avoiding the other objections previously mentioned.

Another object of my invention is to provide a leveling apparatus in which the leveler housing and the hydraulically operated piston means therein are disposed in floating relation to the

2 two operating shafts while the car is running, the pistons being arranged to gravitate in the housing to retracted positions after each leveling operation, so that the leveling apparatus is completely divorced from and cannot possibly interfere in any way with the normal functioning of the vehicle spring suspension, although the pistons are always ready for instant use and are movable quickly to operative positions whenever a leveling operation is needed.

Still another important feature of the leveling apparatus of my invention is the differential action of the mechanism interconnecting the two shafts so that the torque is transmitted first to whichever shaft exerts the lesser resistance to turning, until the resistance to turning is equalized between the two shafts, after which the torque is applied to both shafts alike, thus distributing the strains evenly between the two shafts in leveling the vehicle, this differential action being obtained by virtue of the floating relationship of the leveler housing to the two shafts. The floating mounting of the housing is, incidentally, also of advantage in avoiding danger of breakage in the event a driver carelessly runs the car while it is still "leveled," namely, without having released the pressure from behind the actuated pair of pistons. The yielding element, formed by the floating housing, will take the road shocks without danger of any breakage.

Another important feature is the provision of spring means tending to return the floating leveler housing to a neutral position after a leveling operation, thus assisting the action of the vehicle springs and insuring quicker return of the pistons to retracted position.

The leveling apparatus of my invention is, furthermore, so designed that all of the working parts operate continuously in an oil bath in the leveler housing, so that wear is definitely reduced to a minimum, and a unit, once properly installed, is not apt to require any attention for the life of the vehicle. Special provision is made in regard to the hydraulically operated pistons so that there will be no danger of air being trapped inside these pistons and acting as a cushioning agent, the cylinders in my improved apparatus having oil inlet tubes extending upwardly into the bottoms thereof to reach all the way to the upper ends of the chambers in the pistons to drain air therefrom and permit complete filling of the space with oil.

The invention is illustrated in the accompanying drawings, in which—

Fig. 1 is a view partly in front elevation and partly in vertical section through a leveling unit made in accordance with my invention, and illustrating also the mode of application to the chassis of a motor vehicle, the piston appearing in section in this view being one of the four in the unit and being shown in fully retracted position;

Fig. 2 is a cross-section on the line 2—2 of Fig. 1, looking in the direction of the arrows, and illustrating the sectioned piston in a raised operating position;

Fig. 3 is a top view of Fig. 1 with the cover plate for the leveler housing removed to show the arrangement of the four cylinders, and with the inner end portions of the shafts on which the cross-heads are mounted broken away and the pistons removed from the cylinders;

Fig. 4 is a view partly in longitudinal section on line 4—4 of Fig. 6 and partly in bottom elevation of the power unit, showing the control valve in section;

Fig. 5 is a plan view of a motor vehicle chassis, showing a typical installation of the leveling unit of my invention;

Fig. 6 is a view partly in side elevation and partly in longitudinal section of Fig. 5;

Fig. 7 is a bottom view of the valve cover;

Fig. 8 is a bottom view of the valve rotor;

Fig. 9 is a top view of the valve stator;

Fig. 10 is a section through the control valve taken in a plane at right angles to Fig. 4 and showing the valve rotor turned to a position for right hand leveling;

Fig. 11 is a top view of the rotor turned to the position of Fig. 10;

Fig. 12 is a top view of the rotor and stator in assembled relation in the position of Fig. 10 for right hand leveling;

Figs. 13, 14, and 15 are views corresponding to Figs. 10, 11, and 12, showing the rotor in neutral position;

Figs. 16, 17, and 18 are views related to Figs. 10, 11, and 12, showing the rotor turned to a position for left hand leveling, and Fig. 19 is an enlarged sectional detail showing one of the two ball check valves appearing in Figs. 10, 13, and 16.

The same reference numerals are applied to corresponding parts throughout the views.

Referring first to Figs. 5 and 6, the reference numerals 20 and 21 designate the opposite side members of the vehicle frame that are connected in the usual way to springs 22 secured by means of the usual shackles 23 to the rear axle housing 24. The leveling unit of my invention is indicated generally by the reference numeral 25, 26 being the leveler housing, and 27 and 28 the two operating shafts coaxially arranged and extending from opposite sides of said housing crosswise of the frame and in substantially parallel relation to the rear axle housing 24, and mounted at their outer ends in bearings 29 detachably secured to the opposite sides of the frame. The shafts 27 and 28 are arranged to be turned in opposite directions by hydraulic means in the housing 26 to raise one side of the frame positively and at the same time positively lower the other side of the frame relative to the rear axle housing 24, the arms 30 and 31 being attached to the shafts 27 and 28, respectively, and pivotally connected at their outer ends to the upper ends of links 32 and 33, whose lower ends are, in turn, pivotally connected to brackets 34 and 35 that are suitably secured to the axle housing 24 and spring shackles 23, whereby to give the leveling movement. Thus, for example, if the shafts 27 and 28 are turned so as to raise the arm 30 and lower the arm 31, the side 20 of the frame will be lowered and the side 21 raised, and vice versa. From this brief description, it should be apparent that the unit 25, not being of the "built-in" type, but rather of what may be called an attachment type, can be installed in a small fraction of the time required to install a "built-in" type, there being only the bearings 29 to mount on the opposite sides of the frame and the brackets 34 and 35 to apply to the housing 24 and spring shackles 23. Incidentally, the bearings 29 are preferably fastened by means of screws 36 to the webs of the channel iron frame members 20 and 21 and have integral bosses 37 projecting from the center of their attaching portions 38 and fitting closely in holes 39 made therefor in plates 40 welded to the webs of the channel iron frame members so that the loads incident to leveling and incident to the support of the unit otherwise are assumed by these bosses 37 and not by the screws 36, the screws serving merely to hold the bearings in place on the frame members. The hubs 41 on the inner ends of the levers 30 and 31 are splined for a slidable spline connection with the splined outer ends 42 of the shafts 27 and 28, and the hubs are also split and have bolts 43 thereon, which, when tightened, clamp the levers 30 and 31 against sidewise movement from a desired adjusted position. Inner race members 44 for the ball bearings 45, provided as a part of the bearings 29, are splined to fit the splined reduced outer ends 46 of the shafts 27 and 28 and are fastened to the shafts by set screws 47 to prevent endwise movement relative to the shafts from a desired adjusted position. Each bearing 29 has a lubricant retainer 48, so that when the bearings have been packed with lubricant, they should not require attention throughout the life of the car.

The leveler housing 26 is supported in floating relation to the vehicle frame on the inner end portions of the shafts 27 and 28 by means of spaced bearings 49 and 50. Cross-heads 51 and 52 are suitably fixedly mounted on the inner end portions of the shafts 27 and 28, respectively, and are generally of arcuate form, as clearly appears in Fig. 2. Rollers 53 are mounted in the opposite ends of the cross-heads for anti-friction rolling contact with the head ends 54 of pistons 55 operable in the bores of cylinders 56, there being two of these cylinders 56 in parallel relation aligned with the opposite ends of each cross-head having pistons 55 therein, and only one of the pistons of each pair being operated at a time, these being always the ones at diagonally opposite corners of the rectangular housing 26, and, hence, at the respectively opposite ends of the two cross-heads, whereby to oscillate the cross-heads 51 and 52 in opposite directions, and, accordingly, turn the shafts 27 and 28 in opposite directions for a leveling movement of the vehicle frame 20—21 relative to the rear axle housing 24. The shafts 27 and 28 have piloting inner end portions 57 received in the bearing 50, whereby to eliminate objectionable deflection of the end portions of the shafts under the leveling loads imposed upon the cross-heads in the operation of the pistons 55. The openings 58 in the side walls of the cylinders 56 to permit the ends of the cross-heads 51—52 to project into the cylinders for cooperation with the pistons 55, as best appears in Fig. 2.

Referring mainly to Figs. 1 to 3, it will be seen that the leveler housing 26 has the cylinders 56 welded at the four corners thereof and that these cylinders have portions of the walls thereof cut away, as indicated at 58, so that the oil or other liquid used as the working fluid, with which the housing 26 is completely filled, can flow freely into and out of the upper ends of the cylinders from the central chamber 59 in the housing. Posts 60 welded at their lower ends, as at 61, to the bottom of the housing 26 have the central bearing 50 welded onto their upper ends. The other bearings 49 for the shafts 27 and 28 are welded to the outer walls of the housing, as shown. A vertical tube 62 is inserted centrally in the bottom of each cylinder 56, and each of these tubes is of a length to reach substantially the full height of the chamber 63 formed in each piston 55, whereby to permit drainage of the oil or other working fluid from behind whichever ones of the pistons have been operated and permit escape of any air that might otherwise be trapped in the upper portions of these piston chambers 63, so that positive operation of the pistons by solid columns of liquid is assured when the pistons are subsequently forced upwardly by the pumping of the oil or other working fluid into the lower ends of two diagonally opposed cylinders 56 through the tubes 62. If any air were present, it would serve as a cushion and the desired positive operation could not be obtained. Each of the pistons has a seal ring 64 entered in an annular groove 65 provided in the lower skirt portion thereof, whereby to minimize leakage of oil past the pistons. Although the housing 26 is substantially completely filled with the oil or other working fluid, upward movement of either pair of diagonally opposed pistons 55 is permitted, because the oil that is delivered under pressure below those two pistons is equivalent to the oil displaced from above those pistons into the chamber 59 and drained from that chamber through a flexible hose 66 into the housing 67 with which said hose is connected as indicated in Figs. 4, 5 and 6. A pump 68 pumps the oil or other working fluid from housing 67 through a suction pipe 68a and it is discharged under pressure through a passage 69 in the housing 67 communicating with the control valve 70. This valve is operated by remote control from the driver's seat, as indicated by the lever 71 in Fig. 6, which is pivoted at 72 in a base 73 for movement through approximately 90°, 45° either way from a neutral midposition, and connected by means of a link 74 with a radius arm 75 attached to the stem 76 of the control valve. Two other flexible hose connections 77 and 78 are provided to conduct the oil or other working fluid under pressure from the stator 79 of the valve 70 to the diagonally opposed pairs of cylinders 56, there being one rigid tube connection 80 interconnecting one pair of diagonally opposed cylinders and another rigid tube 81 interconnecting the other pair of diagonally opposed cylinders, as clearly indicated in Fig. 3, these two connections being, of course, between the lower ends of the cylinders and being made through the fittings 82 with which the vertical inlet tubes 62, previously mentioned, communicate. Now, assuming the lever 71 is moved to the full line position, marked R, shown in Fig. 6, for right hand leveling and the operator depresses the push-button switch 83 provided on the instrument panel of the vehicle and electrically connected, as shown in Fig. 5, with a relay switch 83a through which the circuit for the motor 84 is completed, the motor will drive the pump 68 through the coupling 85, shown in Fig. 4. Oil is, therefore, delivered under pressure through flexible hose connection 78 to the appropriate diagonally opposed cylinders 56, so as to depress arm 30 and elevate arm 31 by clockwise rotation of shaft 27 and counterclockwise rotation of shaft 28. On the other hand, assuming that lever 71 was moved from the neutral position N, Fig. 6, to the other extreme position indicated in dotted lines, marked L, for left hand leveling, oil under pressure is delivered through hose connection 77 to the other pair of diagonally opposed cylinders 56, so as to depress arm 31 and elevate arm 30 by clockwise rotation of shaft 28 and counterclockwise rotation of shaft 27. The housing 26, the top of which is sealed by a cover plate 86, is free to have pendulum-like movement with respect to the coaxially aligned shafts 27 and 28, and when oil under pressure is delivered to either pair of diagonally opposed cylinders 56, the torque for leveling is transmitted first to whichever one of the two shafts 27 and 28 exerts the lesser resistance to turning, thus moving the arm 30 or 31, as the case may be, attached to that shaft, at double the speed until the resistance to turning of the two shafts is equalized, after which the two shafts will be turned at the same speed in opposite directions until the vehicle leveling operation is completed, the strains incident to the leveling operation being, accordingly, evenly divided between the two shafts. It is only by virtue of the floating or pendulum mounting of the leveler housing 26 relative to the two shafts 27 and 28 that this differential action is obtainable. Two vertically spaced, substantially horizontal tension springs 87 are attached at one end, one to the upper and the other to the lower end of the housing 26, above and below the level of the shafts 27 and 28, and are anchored at their other ends to two relatively fixed members 88 on the vehicle frame 20—21, resisting swinging movement of the housing 26 and tending to hold it in the vertical position shown. When the vehicle body is to be permitted to return to its normal position after a leveling operation, the operator moves the lever 71 to the neutral position N, in Fig. 6, thus permitting escape of oil from below whichever pair of pistons 55 has been elevated and allowing these pistons to return by gravity to the lower ends of their cylinders, where they are sufficiently spaced in relation to the cross-heads 51 and 52 so that the cross-heads cannot possibly come into contact with the pistons regardless of the extent of deflection of the vehicle springs incident to traveling over rough ground.

The control valve 70 comprises in addition to the stator 79, shown in plan view in Fig. 9, a rotor 89, shown in bottom elevation in Fig. 8 and in top elevation in Figs. 11, 14, and 17, and a bonnet or cover 90, shown in bottom elevation in Fig. 7 and in cross-section in Figs. 10, 13 and 16. The rotor 89, which turns with the stem 76, is shown in plan view in Figs. 12, 15 and 18, superposed on the stator 79 to better illustrate the functioning of the valve in right hand leveling, neutral, and left hand leveling, respectively. The rotor 89 is always held seated under pressure of a coiled compression spring 91, and, during leveling, under pressure of the discharge side of the pump, oil being delivered to the inside of the bonnet 90 from passage 68 in the housing 67 through port 92 in the stator and either of two ports 93 in the rotor, the other of said two ports serving to conduct oil under pressure from the bonnet to hose 77 or 78 depending upon the position of the rotor. Thus, in Figs. 10 and 12, the one port 93 communicates with hose 78 for right hand leveling, and in Figs. 16 and 18 the other port 93 communicates with hose 77 for left hand leveling. The spring pressed ball check valves 94, as best shown in Fig. 19, allow only outward flow of oil to the hose connections 77 and 78, whereby to trap the oil under whichever pair of diagonally opposed pistons 55 have been operated, and, accordingly, hold the vehicle leveled, so long as that may be desired, after the operator has stopped the operation of motor 84. The valves 94 seat at 95 in the ports in the stator, and whichever valve 94 is in use will remain seated until the operator turns the rotor 89 back to neutral position, in which position a web between two small closely spaced ports 96 serves to unseat the valve, allowing return flow of oil from the cylinders. The ports 93 are flared on the under side of the rotor 89, as clearly appears in Figs. 8 and 19, so as to afford ample operating clearance for the spring pressed ball check valves 94 when the rotor is turned to either of the two positions shown in Figs. 12 and 18 for right or left hand leveling, respectively. When the rotor 89 is turned from the neutral position either way, for right or left hand leveling, at which time oil under pressure is delivered through one of the ports 93 in the rotor to one of the hose connections 77 and 78, an elongated arcuate groove 97, provided in the bottom face of the rotor, establishes communication between the other of said hose connections and a drain port 98 provided in the stator, the ball check valve 94 being held down off its seat by the rotor, so as to afford open communication between the related hose connection and the drain port by way of the groove 97. (See Figs. 10, 12, and 16, and 18.) The drain port 98 in the stator communicates with a port 99 in the housing 67 for discharge into said housing as a sump. When the rotor 89 is in the neutral position, shown in Figs. 14 and 15, a drain port 102, provided in the rotor, registers with a drain port 103 provided in the stator, and that port, in turn, communicates with a port 104 in the wall of the housing 67 for discharge into said housing as a sump. In that way the whole system is interconnected, and whatever pistons have been operated under hydraulic pressure for a leveling operation have the pressure behind them immediately relieved, and the pistons are free to gravitate of their own weight to the lower ends of their cylinders. A stop pin 105 provided in the bonnet 90 projects downwardly over the peripheral portion of the rotor 89 into the gap 106 defined where an upwardly projecting peripheral rim portion 107 on the rotor is cut away throughout approximately 90°, whereby to define stop shoulders 108 for engagement with the stop pin 105, positively to limit the turning of the rotor 89 when it reaches the positions shown in Figs. 12 and 18 for right and left hand leveling, respectively. There are two spring pressed detents 109, which are in substantially diametrically opposed relation in the bonnet 90 and ride on top of the upwardly projecting rim 107 on the rotor, and are arranged to drop into small V-shaped notches 110 when the rotor 89 is turned to the neutral position, as shown in Figs. 13, 14, and 15, whereby releasably to lock the valve in the neutral position and also let the operator known by the "feel" on the knob of the lever 71 when he has reached the neutral position in the movement of said lever.

In operation, the lever 71 is left in the neutral position N, Fig. 6, until the time when the vehicle is to be leveled, as, for example, when the hearse is at a curb ready to unload a casket. This usually calls for right hand leveling, and the operator in that event moves the lever 71 to the vertical position R, Fig. 6, shifting the valve 70 to the position shown in Figs. 10 to 12 for right hand leveling. The switch button 83 is depressed and held depressed so long as the leveling operation is continued, the extent of leveling being, therefore, entirely under the control of the operator. The pump 58 driven by the motor 84 draws oil through the pipe 68a from the housing 67, and delivers it through the hose connection 78 to one pair of diagonally opposed cylinders 56 causing the pistons 55 therein to be moved upwardly under hydraulic pressure and, accordingly, turning the shafts 27 and 28 in opposite directions for the leveling operation. Oil is displaced from above these pistons in this upward movement and, accordingly, that amount of oil is discharged from the housing 26 through hose connection 66 back to the housing 67. The whole system can, therefore, remain filled with oil, thereby avoiding any likelihood of air pockets being formed at critical points and interfering with the positive operation of the apparatus. The tubes 62 that deliver the oil to the cylinders 56 and drain the oil therefrom reach to the upper ends of the chambers 63 in the pistons in their lowermost positions, thereby allowing escape of any air that might be pocketed in the upper end of one or more of the piston chambers. After the operator releases the push-button 83, the vehicle remains leveled so long as the valve 70 is left in the leveling position, because the spring pressed ball check valves 94 prevent return flow of the oil from under the operated pistons. Reference has been made previously to the floating or pendulum movement of the housing 26 with respect to the shafts 27 and 28, which accounts for the highly desirable differential action of the leveling apparatus and equalized torque on the two shafts 27 and 28 in leveling. This pendulum movement of the housing 26 is also of advantage in the event the operator drives the vehicle before he has returned the lever 71 to neutral position N, because, in that event, the housing provides the yieldable element needed to take the road shocks and avoid danger of breakage of parts. When the lever 71 is returned to the neutral position N, the spring pressed ball check valves 94 are unseated, as illustrated in Fig. 13, and, hence, the pressure under the operated pistons 55 is immediately relieved and those pistons gravitate toward the lower ends of their cylinders, the oil displaced from below these pistons being returned to the housing 67 through the hose connection 78, and an equal amount of oil being drawn into the upper ends of the cylinders 55 over the descending pistons from the housing 67 through the hose connection 66.

It is believed the foregoing description conveys a good understanding of the objects and advantages of my invention. The appended claims have been drawn to cover all legitimate modifications and adaptations.

I claim:

1. In a vehicle frame leveling apparatus, a housing, two shafts to be power oscillated extending from opposite sides of said housing to the opposite sides of said frame where they have connection with frame elevating and lowering means, arms on the inner ends of said shafts in said housing, cylinders in said housing into which the outer ends of said arms project, and power operable pistons reciprocable in said cylinders toward and away from the ends of said arms.

2. In a vehicle frame leveling apparatus, a housing, two shafts to be power oscillated extending from opposite sides of said housing to the opposite sides of said frame where they have connection with frame elevating and lowering means, a cross-head providing oppositely extending arms on the inner end of each of said shafts in said housing, four cylinders in said housing into which the outer ends of said arms project, and pistons reciprocable in said cylinders toward and away from the ends of said arms, so as to turn the shafts respectively in opposite directions.

3. In a vehicle frame leveling apparatus, a housing, two shafts to be power oscillated extending from opposite sides of said housing to the opposite sides of said frame where they have connection with frame elevating and lowering means, arms on the inner ends of said shafts in said housing, upright cylinders in said housing into the upper ends of which the outer ends of said arms project, and pistons in said cylinders that normally gravitate to the lower ends thereof in retracted relation to the arms but are power operable upwardly to engage and transmit movement to said arms.

4. In a vehicle frame leveling apparatus, a housing, two shafts to be power oscillated extending from opposite sides of said housing to the opposite sides of said frame where they have connection with frame elevating and lowering means, a cross-head providing oppositely extending arms on the inner end of each of said shafts in said housing, four upright cylinders in said housing into the upper ends of which the outer ends of said arms project, and pistons in said cylinders that normally gravitate to the lower ends thereof in retracted relation to the arms but are power operable upwardly in such a way as to engage and transmit movement to the arms to turn the shafts respectively in opposite directions.

5. The combination with the axle and the spring supported frame of a vehicle, of a leveling mechanism for the frame, including frame raising and lowering means at the opposite side portions of said frame working between the axle and frame, a source of pressure fluid supply, and piston and cylinder means operable under fluid pressure from said source and connected to operate the frame raising and lowering means, said piston and cylinder means including a piston free to gravitate to a retracted position relative to the frame raising and lowering means, whereby to permit substantially unobstructed movement of said frame raising and lowering means between leveling operations.

6. The combination with the axle and the spring supported frame of a vehicle, of a leveling mechanism for the frame, including frame raising and lowering means at the opposite side portions of said frame working between the axle and frame to raise either side and lower the opposite side of said frame, a source of pressure fluid supply, and piston and cylinder means operatively associated with each of said frame lowering and raising means, each of said piston and cylinder means including two pistons so related to the frame lowering and raising means operable thereby, that when one of said pistons is operated, said means is operated to raise the frame, and when the other of said pistons is operated, said means is operated to lower the frame, both of the pistons being free to gravitate to retracted positions relative to the frame raising and lowering means, whereby to permit substantially unobstructed movement of said frame raising and lowering means between leveling operations.

7. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and he other of which shafts is correspondingly connected by an arm on the other side of the frame to elevate one side while depressing the opposite side of the frame, a housing into which said shafts extend, and power operable piston means in said housing movable upwardly from a retracted position relative to the shafts to operative position to turn said shafts in opposite directions to elevate one side of said frame and depress the other side relative to the wheeled structure, said piston means tending normally to gravitate downwardly to the retracted position.

8. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame, a housing into which said shafts extend, and power operable piston means in said housing normally movable independently of said shafts in one direction to a retracted position relative to the shafts but movable under power in the opposite direction to turn said shafts in opposite directions to elevate one side of said frame and depress the other side relative to the wheeled structure.

9. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame, a housing into which said shafts extend, a pair of power operable pistons in said housing associated with each of said shafts, either of which is movable upwardly from a retracted position relative to the associated shaft to operative position to turn the shaft, and means interconnecting for simultaneous operation one piston of each pair, whereby to turn said shafts in opposite directions to elevate either side of said frame and depress the other side relative to the wheeled structure, said pistons being free to gravitate downwardly to their retracted positions.

10. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame, a housing into which said shafts extend, a pair of power operable pistons in said housing associated with each of said shafts, both of which tend normally to move to retracted positions relative to the shaft, either of said pistons being movable toward operative position to turn the shaft, and means interconnecting for simultaneous operation one piston of each pair, whereby to turn said shafts in opposite directions to elevate either side of said frame and depress the other side relative to the wheeled structure.

11. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame, a generally rectangular housing into the opposite sides of which said shafts extend for power operation, said housing being free to oscillate relative to said shafts, cross-heads fixed on the inner ends of said shafts and disposed in coaxially spaced relation adjacent opposite sides of said housing, upright cylinders in the four corners of said housing having the end portions of said cross-heads extending into the upper ends thereof, the lower ends of diagonally opposed cylinders being interconnected, a source of pressure fluid supply arranged to be placed in communication with the lower end of either pair of diagonally opposed cylinders, and pistons movable from retracted lower positions in said cylinders upwardly under fluid pressure to engage the ends of said cross-heads to turn said shafts in opposite directions.

12. A structure as set forth in claim 11, including spring means acting between the frame and said housing, tending normally to hold it in a substantially vertical position.

13. A structure as set forth in claim 11, wherein the pistons are of hollow construction providing chambers therein open at the lower ends thereof, the structure including a tube extending upwardly from the lower end of each cylinder for delivery of the pressure fluid into and drainage of fluid from the cylinders, said tubes being of a length to reach substantially to the upper end of the chambers in said pistons in their lowermost positions.

14. In a vehicle, the combination of a wheeled structure, a frame, yieldable suspension means supporting said frame on said wheeled structure, shafts supported on opposite sides of said frame for rotation, one of which shafts is connected by an arm with the wheeled structure on one side of the frame and the other of which shafts is correspondingly connected by an arm on the other side of the frame to elevate one side while depressing the opposite side of the frame, a housing into the opposite sides of which said shafts extend for power operation, cross-heads fixed on the inner ends of said shafts and disposed adjacent opposite sides of said housing, upright cylinders in said housing having the end portions of said cross-heads extending into the upper ends thereof, the lower ends of diagonally opposed cylinders being interconnected, a source of pressure fluid supply arranged to be placed in communication with the lower end of either pair of diagonally opposed cylinders, and pistons movable from retracted lower positions in said cylinders upwardly under fluid pressure to engage the ends of said cross-heads to turn said shafts in opposite directions.

15. A structure as set forth in claim 14, wherein the pistons are of hollow construction providing chambers therein open at the lower ends thereof, the structure including a tube extending upwardly from the lower end of each cylinder for delivery of the pressure fluid into the drainage of fluid from the cylinders, said tubes being of a length to reach substantially to the upper end of the chambers in said pistons in their lowermost positions.

16. In a vehicle frame leveling apparatus, a housing, two shafts to be power oscillated extending from opposite sides of said housing to the opposite sides of said frame where they have connection with frame elevating and lowering means, arms on the inner ends of said shafts in said housing, upright cylinders in said housing into the upper ends of which the outer ends of said arms project, a source of pressure fluid supply, pistons movable upwardly in said cylinders under fluid pressure toward the ends of said arms and arranged to gravitate downwardly away from said arms to retracted positions in the lower ends of said cylinders, said pistons being of hollow construction providing chambers therein open at the lower ends thereof, and upright tubes in the lower ends of said cylinders for delivering the pressure fluid thereto and draining fluid therefrom, said tubes being of a length to reach substantially to the upper ends of said chambers in said pistons in their lowermost positions.

17. In a vehicle frame leveling apparatus, a housing, two shafts to be power oscillated extending from opposite sides of said housing to the opposite sides of said frame where they have connection with frame elevating and lowering means, a cross-head providing oppositely extending arms on the inner end of each of said shafts in said housing, four upright cylinders in said housing into the upper ends of which the outer ends of said arms project, a source of pressure fluid supply, pistons movable upwardly in said cylinders under fluid pressure toward the ends of said arms and arranged to gravitate downwardly away from said arms to retracted positions in the lower ends of said cylinders, said pistons being of hollow construction providing chambers therein open at the lower ends thereof, and upright tubes in the lower ends of said cylinders for delivering the pressure fluid thereto and draining fluid therefrom, said tubes being of a length to reach substantially to the upper ends of said chambers in said pistons in their lowermost positions, the tubes for diagonally opposed ones of the four cylinders being interconnected, whereby pistons in diagonally opposed cylinders are operated simultaneously to turn the shafts respectively in opposite directions.

18. In a vehicle frame leveling apparatus, a generally rectangular housing, two coaxial shafts to be power oscillated extending from diametrically opposite sides of said housing, said shafts being connected at their outer ends to frame elevating and lowering means on opposite sides of said frame, upright cylinders in parallel spaced relation in the four corners of said housing having openings provided in the adjacent inner side walls thereof at the upper ends of said cylinders, cross-heads on the inner ends of said shafts providing oppositely extending arms reaching through said openings in the cylinder walls into said cylinders, said housing and cylinders being substantially completely filled with a liquid medium, a power operable pump having a suction conduit communicating with the space in said housing between said cylinders to withdraw liquid therefrom, a control valve receiving the liquid discharged under pressure from said pump, two pressure conduits extending from said valve to said housing, the one conduit communicating with the lower ends of two diagonally opposed cylinders and the other conduit communicating with the lower ends of the other pair of diagonally opposed cylinders, and pistons in said cylinders movable from retracted positions in the lower ends of the cylinders upwardly under fluid pressure.

19. A structure as set forth in claim 18, wherein said pistons are of hollow construction providing chambers therein open at the lower ends thereof, the structure including an upright tube in the lower end of each of said cylinders for delivering liquid under pressure therein and draining liquid therefrom, said tubes being of a length to reach the upper ends of said chambers in the lowermost positions of said pistons.

20. A structure as set forth in claim 18, including rollers mounted on the outer ends of the arms or said cross-heads for anti-friction rolling engagement on top of said pistons.

21. In a vehicle frame leveling apparatus, the combination of housing means, two shafts journaled in the housing means for rotation and connected with frame elevating and lowering means on opposite sides of said frame, cylinders in said housing means with power operable pistons reciprocable therein, and means on said shafts providing detachable operating connections with said pistons, so that the shafts are adapted to turn independently of the pistons but may be turned by said pistons in the power operation of the latter.

22. In a vehicle frame leveling apparatus, the combination of housing means, two shafts journaled in the housing means for rotation and connected with frame elevating and lowering means on opposite sides of said frame, two cylinders associated with each of said shafts in said housing means with power operable pistons reciprocable therein, and means on said shafts providing detachable driving connections for each shaft with either of the pistons associated therewith for power rotation of the shaft in either direction, the shafts being free to turn independently of the pistons and the pistons being power operable in such relationship to one another to cause power rotation of the shafts, respectively, in opposite directions.

23. In a vehicle frame leveling apparatus, a housing, two shafts to be power oscillated extending from opposite sides of said housing to the opposite sides of said frame where they have connection with frame elevating and lowering means, arms on the inner ends of said shafts in said housing, cylinders in said housing into which the outer ends of said arms project, power operable pistons reciprocable in said cylinders toward and away from the ends of said arms, and rollers mounted on the outer ends of said arms arranged for anti-friction rolling engagement on top of said pistons.

24. In a vehicle frame leveling apparatus, a housing, two shafts to be power oscillated extending from opposite sides of said housing to the opposite sides of said frame where they have connection with frame elevating and lowering means, a cross-head providing oppositely extending arms on the inner end of each of said shafts in said housing, four cylinders in said housing into which the outer ends of said arms project, pistons reciprocable in said cylinders toward and away from the ends of said arms, so as to turn the shafts respectively in opposite directions, and rollers mounted on the outer ends of said arms arranged for anti-friction rolling engagement on top of said pistons.

25. The combination with the axle and the spring supported frame of a vehicle, of a leveling mechanism for the frame, including frame raising and lowering means at the opposite side portions of said frame working between the axle and frame, a source of pressure fluid supply, piston and cylinder means operable under fluid pressure from said source and connected to operate the frame raising and lowering means, said piston and cylinder means including a piston free to gravitate to a retracted position relative to the frame raising and lowering means, whereby to permit substantially unobstructed movement of said frame raising and lowering means between leveling operations, and rollers carried by the frame raising and lowering means and arranged for anti-friction rolling engagement on top of said pistons.

26. The combination with the axle and the spring supported frame of a vehicle, of a leveling mechanism for the frame, including frame raising and lowering means at the opposite side portions of said frame working between the axle and frame to raise either side and lower the opposite side of said frame, a source of pressure fluid supply, piston and cylinder means operatively associated with each of said frame lowering and raising means, each of said piston and cylinder means including two pistons so related to the frame lowering and raising means operable thereby that when one of said pistons is operated, said means is operated to raise the frame, and when the other of said pistons is operated, said means is operated to lower the frame, both of the pistons being free to gravitate to retracted positions relative to the frame raising and lowering means, whereby to permit substantially unobstructed movement of said frame raising and lowering means between leveling operations, and rollers carried by the frame raising and lowering means and arranged for anti-friction rolling engagement on top of said pistons.

27. In a vehicle, the combination of a wheeled structure, a frame, yieldable suspension means supporting said frame on said wheeled structure, housing means, two shafts journaled in the housing means for rotation and connected with frame elevating and lowering means on opposite sides of said frame, a pair of power operable pistons in said housing means operatively associated with each of said shafts, either of which is movable upwardly from a retracted position relative to the associated shaft to operative position to turn the shaft, and means interconnecting for simultaneous operation one piston of each pair, whereby to turn said shafts in opposite directions to elevate either side of said frame and depress the other side relative to the wheeled structure, said pistons being free to gravitate downwardly to their retracted positions.

28. In a vehicle, the combination of a wheeled structure, a frame, yieldable suspension means supporting said frame on said wheeled structure, housing means, two shafts journaled in the housing means for rotation and connected with frame elevating and lowering means on opposite sides of said frame, a pair of power operable pistons in said housing means operatively associated with each of said shafts, both of which tend normally to move to retracted positions relative to the shaft, either of said pistons being movable toward operative position to turn the shaft, and means interconnecting for simultaneous operation one piston of each pair, whereby to turn said shafts in opposite directions to elevate either side of said frame and depress the other side relative to the wheeled structure.

29. In a vehicle frame leveling apparatus, the combination of housing means, two shafts journaled in the housing means for rotation and connected with frame elevating and lowering means on opposite sides of said frame, substantially upright cylinders in said housing means with pistons reciprocable therein under fluid pressure, means on said shafts providing detachable operating connections with said pistons so that the shafts are adapted to turn independently of the pistons but may be turned by said pistons when the latter are moved upwardly under fluid pressure, said pistons being of hollow construction providing chambers therein open at the lower ends thereof, and upright tubes in the lower ends of said cylinders for delivering the pressure fluid thereto and draining fluid therefrom, said tubes being of a length to reach substantially to the upper ends of said chambers in said pistons in their lowermost positions.

30. In a vehicle frame leveling apparatus, the combination of housing means, two shafts journaled in the housing means for rotation and connected with frame elevating and lowering means on opposite sides of said frame, substantially upright cylinders in said housing means with pistons reciprocable therein under fluid pressure, means on said shafts providing detachable operating connections with said pistons so that the shafts are adapted to turn independently of the pistons but may be turned by said pistons when the latter are moved upwardly under fluid pressure, said pistons being of hollow construction providing chambers therein open at the lower ends thereof, and upright tubes in the lower ends of said cylinders for delivering the pressure fluid thereto and draining fluid therefrom, said tubes being of a length to reach substantially to the upper ends of said chambers in said pistons in their lowermost positions, there being two pistons in two cylinders associated with each of said shafts, and the tubes for diametrically opposed cylinders of the two pairs being interconnected, whereby the shafts are turned, respectively, in opposite directions.

31. In a vehicle frame leveling apparatus, the combination of housing means, two shafts journaled in the housing means for rotation and connected with frame elevating and lowering means on opposite sides of said frame, cylinders in said housing means with pistons reciprocable therein under fluid pressure, said housing means and cylinders being substantially completely filled with a liquid medium for the fluid pressure, a power operable pump having a suction conduit communicating with the space in the housing means outside the cylinders to withdraw liquid therefrom, and pressure conduits for conducting the liquid under pressure from the pump to the cylinders to move the pistons under fluid pressure for power operation of said shafts.

32. In a vehicle frame leveling apparatus, the combination of housing means, two shafts journaled in the housing means for rotation and connected with frame elevating and lowering means on opposite sides of said frame, cylinders in said housing means with pistons reciprocable therein under fluid pressure, said housing means and cylinders being substantially completely filled with a liquid medium for the fluid pressure, a power operable pump having a suction conduit communicating with the space in the housing means outside the cylinders to withdraw liquid therefrom, and pressure conduits for conducting the liquid under pressure from the pump to the cylinders to move the pistons under fluid pressure for power operation of said shafts, there being two cylinders and pistons therein operatively associated with each of said shafts to permit power operation of both shafts in either direction, and a control valve between the discharge side of the pump and the pressure conduits for directing the liquid to said cylinders so as to turn the shafts, respectively, in opposite directions to elevate either side of the frame selectively.

33. In a vehicle frame leveling apparatus, the combination of housing means, a shaft journaled in the housing means for rotation and connected with the frame for a leveling operation, a cylinder in said housing means containing a power operable piston reciprocable therein, and means on said shaft providing a detachable operating connection with said piston so that the shaft may turn independently of the piston but may be turned by said piston in the power operation thereof.

34. In a vehicle frame leveling apparatus, a housing means, a shaft to be power oscillated journaled in the housing means and connected with frame leveling means, a cylinder in said housing means containing a power operable piston reciprocable therein, and means providing a detachable operating connection between the piston and said shaft so that the piston which is normally free to gravitate to a retracted position in the cylinder but is power operable in the other direction will transmit oscillatory movement to said shaft to level the frame.

EDWARD RICHTER.

REFERENCES CITED

The following references are of record in the file of this patent:

UNITED STATES PATENTS

| Number | Name | Date |
| --- | --- | --- |
| 2,148,504 | Richter | Feb. 28, 1939 |
| 2,306,284 | Shonnard | Dec. 22, 1942 |